(12) United States Patent
Rinck et al.

(10) Patent No.: US 9,427,113 B2
(45) Date of Patent: Aug. 30, 2016

(54) UNDERMOUNT CABINET STORAGE SYSTEM

(71) Applicants: Lance A Rinck, Olathe, KS (US); Michael E Carnes, Overland Park, KS (US)

(72) Inventors: Lance A Rinck, Olathe, KS (US); Michael E Carnes, Overland Park, KS (US)

( * ) Notice: Subject to any disclaimer, the term of this patent is extended or adjusted under 35 U.S.C. 154(b) by 0 days.

(21) Appl. No.: 14/550,680

(22) Filed: Nov. 21, 2014

(65) Prior Publication Data

US 2016/0143485 A1    May 26, 2016

(51) Int. Cl.
| | | |
|---|---|---|
| A47J 45/02 | (2006.01) | |
| A47G 29/087 | (2006.01) | |
| A47G 19/08 | (2006.01) | |
| F16M 13/02 | (2006.01) | |

(52) U.S. Cl.
CPC ............ *A47J 45/02* (2013.01); *A47G 19/08* (2013.01); *A47G 29/087* (2013.01); *F16M 13/022* (2013.01)

(58) Field of Classification Search
CPC ........ A47J 45/00; A47J 45/02; A47B 77/00; A47G 19/08; A47G 19/10; A47G 29/087; F16M 13/022
USPC ......................................................... 211/116
See application file for complete search history.

(56) References Cited

U.S. PATENT DOCUMENTS

| | | | | |
|---|---|---|---|---|
| 1,664,124 A * | 3/1928 | Lorenz | ................. | B60H 3/0252 160/DIG. 3 |
| 2,165,654 A * | 7/1939 | Rosenthal | ............... | A47J 47/16 211/41.11 |
| 2,662,717 A * | 12/1953 | Johnson | ................... | A47J 47/16 211/32 |
| 4,434,897 A * | 3/1984 | Gelhaus | .................. | D06F 57/12 211/1.3 |
| 4,460,145 A * | 7/1984 | Ando | ...................... | A47B 46/00 108/140 |
| 6,119,879 A * | 9/2000 | Acchione | ............... | A47B 77/10 16/359 |
| 6,318,567 B1 * | 11/2001 | Braley | .................. | A47B 49/004 211/150 |
| 8,413,822 B2 * | 4/2013 | Bailey | .................. | A47B 23/043 211/175 |
| 2005/0258321 A1 * | 11/2005 | Worrall | ................ | F16M 11/046 248/201 |
| 2012/0318937 A1 * | 12/2012 | Carnevali | ............ | F16M 11/041 248/122.1 |
| 2015/0305594 A1 * | 10/2015 | Jarl | ........................ | A47B 81/04 211/41.5 |

* cited by examiner

*Primary Examiner* — Korie H Chan
(74) *Attorney, Agent, or Firm* — Intellectual Property Center LLC; Arthur K. Shaffer

(57) ABSTRACT

The present invention provides an undermount cabinet storage system adapted for receipt of at least one common kitchen items, said undermount cabinet storage system including a mounting bracket in pivotable receipt of a vertical support structure movable between a horizontal position and a vertical position with a pair of rotatable arms associated with a distal end of the vertical support member and adapted for receipt of the kitchen item.

6 Claims, 3 Drawing Sheets

UNDERMOUNT CABINET STORAGE SYSTEM

FIELD OF THE INVENTION

The present invention relates generally to collapsible cooling racks and more specifically to a storable kitchen system with a foldable kitchen rack mounted to a kitchen cabinet for holding a plurality of items like cookie sheets or plates to free up counter space.

BACKGROUND OF THE INVENTION

Typical kitchen space is difficult to maintain. Most kitchen counters are flat horizontal surfaces. In design these counters are flat to allow for work around the kitchen. However, these counter spaces are often cluttered with kitchen gadgets, appliances and other kitchen items which take away from the working area of these counters. While cooking in the kitchen, it is often desirable to place a hot item out of reach or to find someplace to hold an item like plates, cooking sheets or lids when these countertops are otherwise occupied. Therefore, it is desirable to have a retractable storage area which can be used without occupying a countertop area.

Some prior attempts to provide additional counter space include utilizing carts, racks or other portable tables or semi-portable storage areas. However, these storage areas even further clutter an already crowded kitchen area and during times of nonuse, obstruct movement around the kitchen. In addition, these carts or racks are difficult to move and can be very heavy depending on the items stored along the rack shelves. It therefore would be beneficial to provide additional storage space which does not obstruct movement within the kitchen while the storage space is not in use.

SUMMARY OF THE INVENTION

The present invention provides a pair of angularly adjustable arms which are secured to a cabinet by a mounting bracket. Each adjustable arm can rotate vertically for storage under a cabinet and horizontally for receipt of a variety of dimensioned kitchen items. A rotatable vertical support extends downwardly from the mounting bracket to support each of the adjustable arms, the vertical support being rotatable for undermounted storage and the mounting bracket being fastened to the cabinet surface. Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
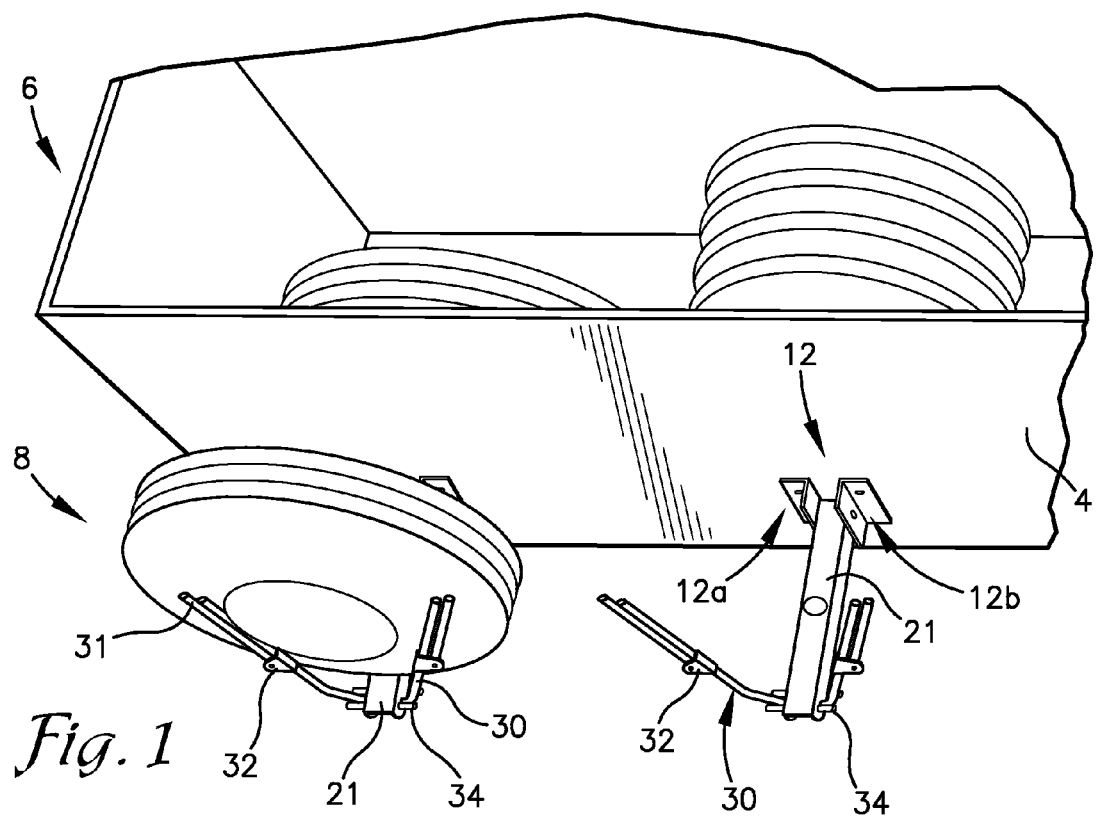
FIG. 1 is a bottom perspective view of an exemplary embodiment of an undermount cabinet storage system including two storage supports, one in operational use in connection with a plurality of plates in accordance with the present invention.
Figure 2:
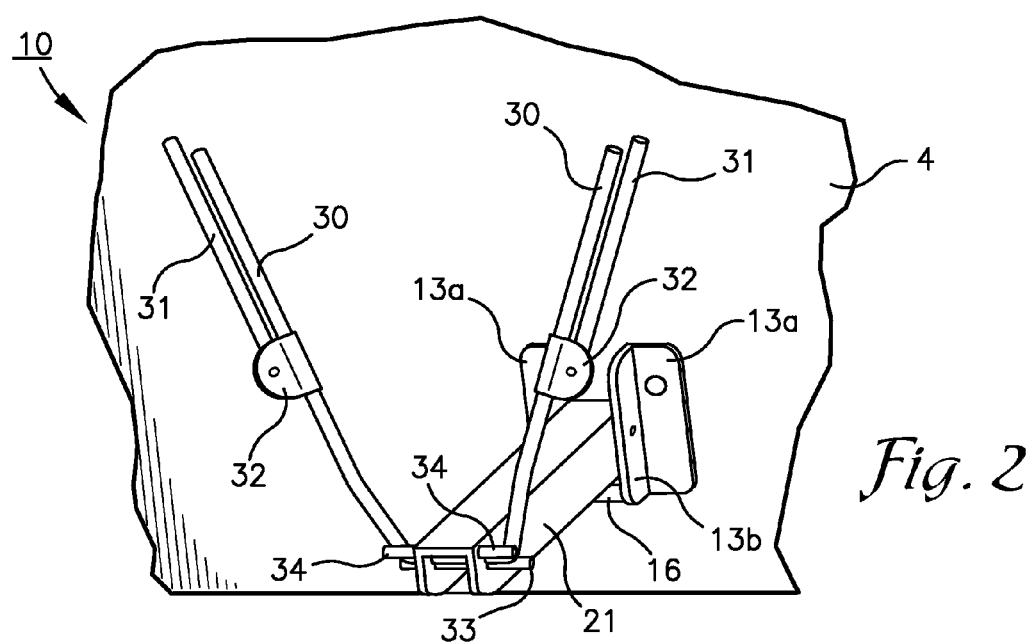
FIG. 2 is a bottom perspective view of a storage support.

As illustrated in FIGS. 1 and 2, an undermount cabinet storage system 10 for receipt of kitchen items 8 which may include common kitchen items like plates, cooking sheets, etc. The undermount cabinet storage system 10 generally includes a mounting bracket 12 for mounting the system 10 to the lower cabinet surface 4 associated with a typical wall cabinet 6 and for receipt and rotation of a vertical support 21 between a horizontal orientation and a vertical orientation wherein the vertical support 21 extends vertically down from the cabinet 6.

A mounting bracket 12 secured to the lower cabinet surface is illustrated in FIG. 1. The mounting bracket as illustrated in FIG. 1, includes a left and right angled surface each of which is mechanically fastened to the lower cabinet surface in the illustrated embodiment and each includes a receiver (not shown) for receiving a rear brace 16. By way of example, the receiver (not shown) may be circular having an outer dimension greater than the outer diameter of the exemplary cylindrical rear brace 16.

The illustrated mounting bracket 12 is generally fabricated from two angularly shaped receivers 12a, 12b such as angle iron, each including at least a first surface 13a for securing to the lower cabinet surface 4 and a second surface 13b for receiving the vertical support 21. Each first surface 13a is generally adapted for being mechanically fastened to the lower cabinet surface 4. Each second surface 13b associated with each of the two shaped receivers 12a, 12b is generally spaced apart a distance compatible with the outer diameter of the vertical support 21, the two shaped receivers 12a, 12b being adapted for rotatable receipt of the vertical support member 21. A rear brace 16 may also be provided as depicted in FIG. 2 extending between each of the second surfaces 13b, the rear brace 16 supporting the vertical support 21 while rotated in the vertically orientation. In this way, the rear brace 16 helps maintain a generally vertical orientation of the vertical support 21 while the rotatable arms 30 are in receipt of a kitchen item 8.

The depicted mounting bracket 12 is illustrated as being mounted towards the rear of the cabinet 6, the vertical support 21 swinging upwardly towards the front of the cabinet where it is secured from view in the recessed horizontal orientation. Alternatively, the mounting bracket 12 could be mounted towards the front of the cabinet and the vertical support 21 could swing upwardly towards the rear of the cabinet for secured in the recessed horizontal orientation. Additionally, the vertical support 21 could swing downwardly from the recessed horizontal orientation and swing down from the left to the right or vice versa and then rotate horizontally as desired. All of these configurations would involve known folding and rotating joints. While one exemplary mounting bracket 12 is depicted, other configurations including those described herein are considered within the scope of the present invention with the mounting bracket 12 being secured to the lower cabinet surface 4 and receiving for receipt of the vertical support 21 while allowing for rotation from a horizontal position to a vertical position in which a locking mechanism or rear brace 16 secures the vertical support 21 in either the vertical or horizontal position.

The vertical support 21 extends from the mounting bracket 12 associated with a proximate end of the vertical support 21 towards a distal end associated with the plurality of rotatable arms 30. The outer surface of the vertical support 21 is adapted for receipt of the rotatable arms 30 therethrough. In one embodiment, the pair of rotatable arms 30 is in communication with each other through a rotatable interconnecting structure which is threaded through the vertical support 21.

In one embodiment, the vertical support 21 may include a square tubing member having being approximately 12" long with a one by one (1"×1") inch square cross-section. In addition, the vertical support 21 may include an upper and lower aperture (not shown), the upper aperture (not shown) being adapted for receipt of a locking mechanism for securing the vertical support 21 to the mounting bracket 12, while allowing for rotation of the vertical member 21 between the vertical and horizontal orientation. The lower aperture (not shown) generally has sufficient dimensions for receipt of the rotatable arm 30 therethrough.

Figure 3:
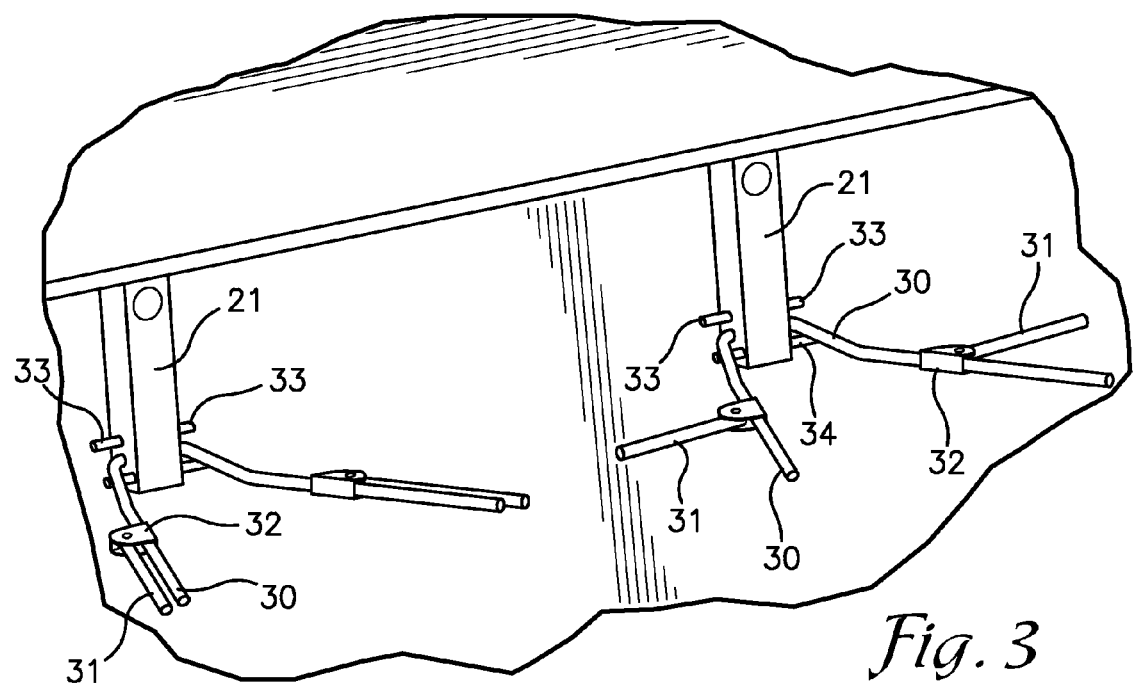
FIG. 3 is a front perspective view of the embodiment depicted in FIG. 1.

In the horizontal orientation, the rotatable arms 30 are rotated upwards and the vertical support 21 is rotated towards the lower cabinet surface 4 with the arms pointing towards the rear of the cabinet 6 and the distal portion of the vertical support 21 being positioned near the front of the cabinet 6 as generally depicted in FIG. 3. In the vertical orientation, the distal end of the vertical support 21 is lowered from the lower cabinet surface 4 towards a generally vertical position with the rotatable arms 30 being lowered to a generally horizontal position as depicted in FIGS. 1-3. In the embodiment illustrated in FIGS. 1-3, each of the rotatable arms 30 are angled slightly upwards to provide more stability during receipt of the kitchen items 8.

Each of the rotatable arms 30 depicted in FIGS. 1-3 include a secondary arm 31 which is rotateably secured to the rotatable arm 30 with a pivoting bracket 32 which is fastened around the rotatable arm 30. In the illustrated configuration, each of the secondary arms 31 generally swing 180 degrees from the rotatable arm 30. When rotated outwardly from the rotatable arm 30 the secondary arm 31 provides additional horizontal support for any received kitchen items 8. When desired, the secondary arm can be extended outwardly or retracted towards the rotatable arm 30 depending on the amount of horizontal support desired.

Numerous brackets and catches may be incorporated into the present invention to help support the system 10 in a recessed horizontal orientation or a vertical orientation. For example, an optional upper and lower stop 33, 34 may be provided along the distal end of the vertical support 21. The upper stop 33 is positioned to provide a vertical stop as the rotatable arm 30 is rotated upwardly and the lower stop 34 is positioned to provide a vertical stop as the rotatable arm 30 is rotated downwardly in relation to the lower cabinet surface 4.

Optionally, the lower end of the vertical support 21 may be adapted for magnetic closure of the system 10 in the horizontal or retracted position with at least one magnetic receiver or plate 14 associated with the lower cabinet surface 4 and a magnetized region (not shown) associated with the vertical support the magnetized region being located near the magnetic receiver 14 while the system 10 is in the horizontal position, the magnetic receiver and magnetized region (not shown) being adapted for magnetic fastening of the vertical support 21 to the lower cabinet surface 4. While the system 10 is in the closed or horizontal configuration, the magnetic receiver 14 receives the magnetized region (not shown) of the vertical support 21.

Figure 4:
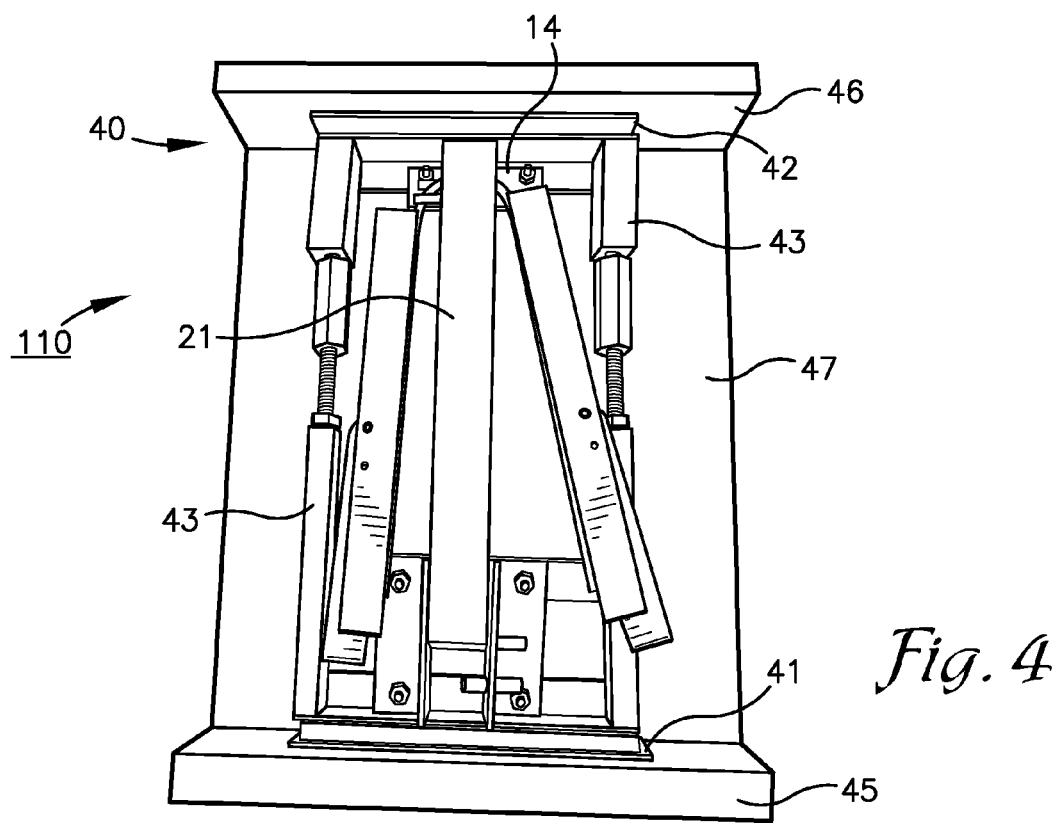
FIG. 4 is a bottom plan view of an alternative mounting structure for mounting an alternative embodiment of the undermount cabinet storage system underneath a cabinet in a retracted position.

An alternative embodiment of the undermount cabinet storage system 110 utilizing a tensioned mounting structure is depicted in FIG. 4 with a front support 41 separated from a rear support 42 with a pair of adjusters 43 which provide the desired pressure at the front and rear supports 41, 42 for mounting the undermount cabinet storage system 110 directly to the cabinet while the system 110 is recessed and hidden from view while the system 110 is in the horizontal orientation. The front support 41 may be associated with a cabinet front face (not shown) and the rear support may be associated with a wall surface (not shown). Alternatively, a mounting platform 40 may be provided with a front support wall 45 spaced from a rear support wall 46 separated by a substantially planar interconnecting member 47, the mounting surface being secured to the underside of the cabinet, and the rear supports 41, 42 may be utilized as an adjustment mechanism and may utilize known adjustment means such as ratcheting means, rotating means, telescoping means, or frictional means.

Figure 5:
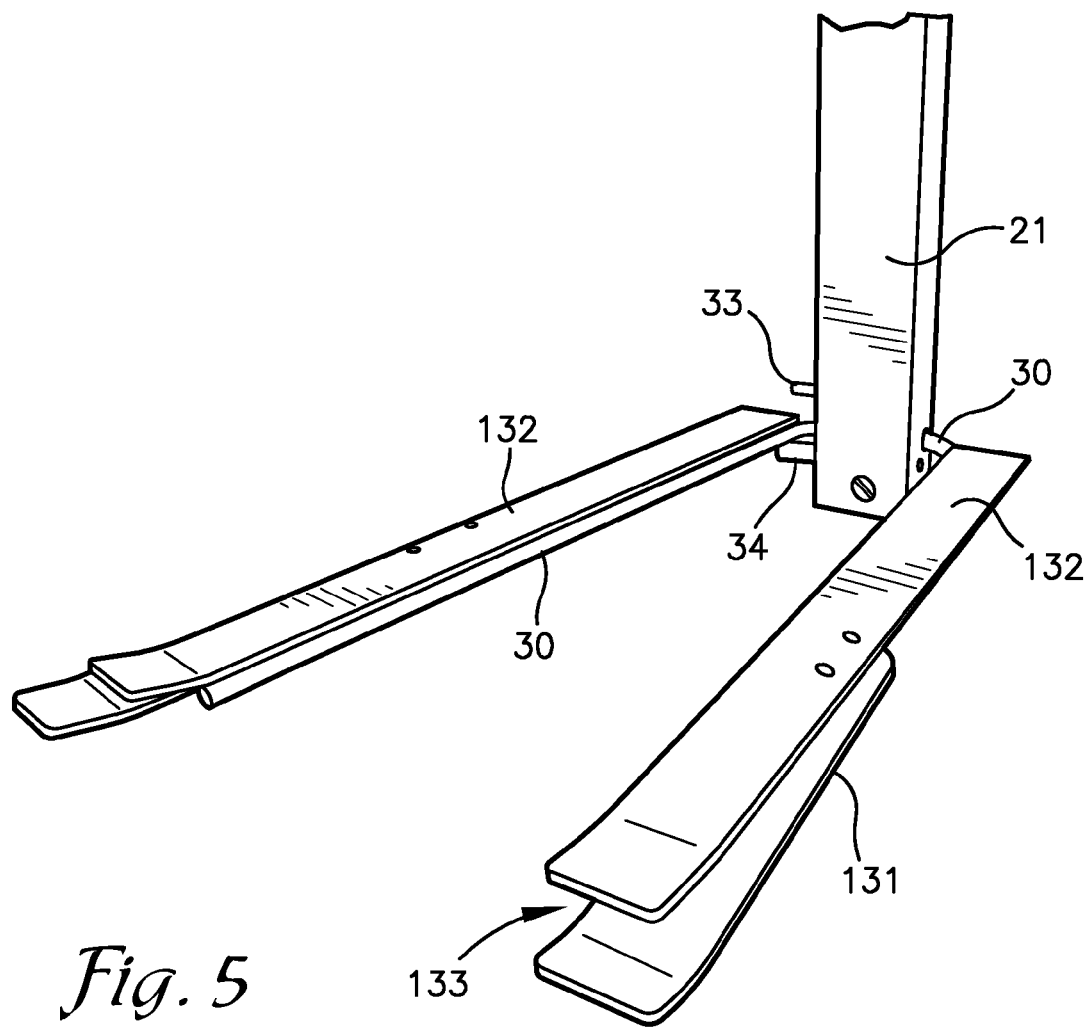
FIG. 5 is a front perspective view of an alternative pair of angularly adjustable arms in accordance with an alternative embodiment depicted in FIG. 4.

Optionally, a pair of longitudinal runners, collectively 131 and 132 are depicted in FIGS. 4 and 5, extend outwardly from and alongside the rotatable arms 30. Each longitudinal runner is depicted with an upper and lower support 132, 131 presenting an insertional arch 133 extending therebetween for receipt of a variety of kitchen items. In one embodiment, the lower support 131 is secured to the upper support 132 which may be secured to the rotatable arm as desired using generally known fastening means such as mechanical fasteners.

In operation, the mounting bracket 12 of the undermount cabinet system 10 is installed on the lower cabinet surface 4 using for example mechanical fasteners (not shown), the mounting bracket 12 being positioned for pivotable receipt of the vertical support 21. The distal end of the vertical support 21 is positioned towards the front of the cabinet 6 with the proximate end being received by the mounting bracket 12. The distal end of the vertical support is secured using for example a magnetic latch (not shown) attached on the lower cabinet surface 4 towards the front of the cabinet 6. The rotatable arms 30 are rotated towards the rear of the cabinet 6 in accordance with the upper stop 33. In operation, the vertical support 21 is lowered and the rotatable arms 30 are rotated towards the horizontal orientation, towards the lower stop 34 with the vertical support 21 being orientated towards a vertically upright position. The rotatable arms are then placed in a generally horizontal orientation with the secondary arms 31 being pivoted outwardly for receipt of the kitchen item 8. When not in use, the system 10 can be placed in the recessed horizontal position by rotating the rotatable arms from the lower stop 34 towards the upper stop 33 and the vertical support 21 is pivoted about the mounting bracket towards the front of the lower cabinet surface 4.

It is to be understood that while certain forms of the present invention have been illustrated and described herein, it is not to be limited to the specific forms or arrangement of parts described and shown. The terms, descriptions and figures used herein are set forth by way of illustration only and are not meant as limitations. Those skilled in the art will readily recognize that many variations are possible within the spirit and scope of the present invention in which all terms are given their broadest, reasonable interpretation and that those skilled in the art may make modifications thereto which do not exceed the scope of the appending claims. Therefore, the scope of the invention is only to be limited by the following claims.

What is claimed and desired to be secured by Letters Patent:

1. An undermount cabinet storage system associated with a lower cabinet surface and adapted for receipt of a common kitchen item, said undermount cabinet storage system comprising:
   a mounting bracket secured to the lower cabinet surface;
   a vertical support structure having a proximate end spaced apart from a distal end, said proximate end received by said mounting bracket;
   a pair of rotatable arms received by said distal end of said vertical support, said pair of rotatable arms being rotated between an upper stop and a lower stop wherein said pair of rotatable arms receives said kitchen item;
   wherein each of said rotatable arms includes a pivotably connected secondary arm; and
   said undermount cabinet storage system being operable between a horizontal orientation and vertical orientation as said vertical support structure is pivoted about said mounting bracket for receipt of at least one of said kitchen item.

2. The undermount cabinet storage system according to claim 1 wherein said mounting bracket further comprises a rear brace.

3. The undermount cabinet storage system according to claim 1 wherein said distal end of said vertical support member is secured to an upper and a lower stop while said undermount cabinet storage system is in the horizontal orientation.

4. The undermount cabinet storage system according to claim 1 further comprising a pair of adjusters adapted for placement between a first cabinet surface and a second cabinet surface, said first and second cabinet surfaces associated with the lower cabinet surface.

5. An undermount cabinet storage. system adapted for receipt of common kitchen items, said undermount cabinet storage system comprising:
   a pressurized mounting structure having a front support wall separated from a rear support wall by a mounting platform;
   said mounting platform being adapted for receipt by a lower cabinet surface associated with a wall cabinet;
   a mounting bracket secured to said mounting platform;
   a vertical support structure having a proximate end spaced apart from a distal end, said proximate end received by said mounting bracket;
   a pair of rotatable arms received by said distal end of said vertical support, said pair of rotatable arms being rotated between an upper stop and a lower stop wherein said pair of rotatable arms receives said kitchen item; and
   said undermount cabinet storage system being operable between a horizontal orientation and a vertical orientation as said vertical support structure is pivoted about said mounting bracket for receipt of at least one of said kitchen item.

6. The undermount cabinet storage system according to claim 5 further comprising a pair of adjusters extending between a first support wall and a second support wall.

* * * * *